(12) United States Patent
Hung et al.

(10) Patent No.: US 6,360,013 B1
(45) Date of Patent: Mar. 19, 2002

(54) FAST METHOD AND SYSTEM FOR TEMPLATE MATCHING ACQUIRING GLOBAL OPTIMA

(75) Inventors: Yi-Ping Hung; Yong-Sheng Chen, both of Taipei (TW)

(73) Assignee: Academia Sinica, Taipei (TW)

( * ) Notice: Subject to any disclaimer, the term of this patent is extended or adjusted under 35 U.S.C. 154(b) by 0 days.

(21) Appl. No.: 09/270,556

(22) Filed: Mar. 16, 1999

(51) Int. Cl.[7] .................................................. G06K 9/64
(52) U.S. Cl. ............................................ 382/217; 707/2
(58) Field of Search ................................ 382/217, 218, 382/225, 212, 215, 220; 707/1, 2, 3

(56) References Cited

U.S. PATENT DOCUMENTS

| | | | | |
|---|---|---|---|---|
| 5,245,675 A | * | 9/1993 | Ferre et al. | 382/159 |
| 5,432,864 A | * | 7/1995 | Lu et al. | 382/118 |
| 5,710,833 A | * | 1/1998 | Moghaddam et al. | 382/228 |
| 6,134,541 A | * | 10/2000 | Castelli et al. | 707/2 |

* cited by examiner

*Primary Examiner*—Andrew W. Johns
*Assistant Examiner*—Seyed Azarian
(74) *Attorney, Agent, or Firm*—Fish & Richardson, P.C.

(57) ABSTRACT

A method is described that greatly reduces the computational cost of determining the globally optimal match between a template and one or more samples. For every sample in a search range, intermediate distance measures between the template and each sample are first computed in one designated dimension. The computed distance measures are then sorted according to their magnitude. The sample with the minimal distance measure is selected to accumulate a new distance measure in the next higher dimension. This new distance measure is recorded and the samples are sorted again according to the updated distance measures. The above process is repeated until a minimal distance measure has been computed in all dimensions. For motion estimate, this method can reduce the number of computational operations by about 90% to 99%. This method can also provide a list of globally best matches. By sacrificing the global optimality, this method can satisfy the time constraint required by some applications and provide a suboptimal match.

24 Claims, 7 Drawing Sheets

| 1 | 2 | 3 | 4 | 5 |
|---|---|---|---|---|
| 6 | 7 | 8 | 9 | 10 |
| 11 | 12 | 13 | 14 | 15 |
| 16 | 17 | 18 | 19 | 20 |
| 21 | 22 | 23 | 24 | 25 | a raster scan order

FIG. 5A

| 25 | 10 | 11 | 12 | 13 |
|---|---|---|---|---|
| 24 | 9 | 2 | 3 | 14 |
| 23 | 8 | 1 | 4 | 15 |
| 22 | 7 | 6 | 5 | 16 |
| 21 | 20 | 19 | 18 | 17 | a spiral order

FIG. 5B

| 9 | 14 | 4 | 20 | 7 |
|---|---|---|---|---|
| 21 | 24 | 11 | 17 | 13 |
| 6 | 18 | 1 | 23 | 2 |
| 15 | 12 | 25 | 10 | 19 |
| 3 | 22 | 8 | 16 | 5 | a designated order

FIG. 5C

| Luminance | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Frequency | 15 | 14 | 3 | 1 | 1 | 8 | 12 | 16 | 13 | 18 | 10 | 15 | 7 | 3 | 10 | 4 |

Histogram of the image

| 10 | 11 | 9 | 12 | 8 |
|---|---|---|---|---|
| 12 | 10 | 7 | 6 | 1 |
| 9 | 6 | 3 | 8 | 2 |
| 7 | 4 | 3 | 5 | 5 |
| 2 | 5 | 1 | 1 | 6 |

Luminance of the template

| 24 | 10 | 13 | 17 | 22 |
|---|---|---|---|---|
| 18 | 25 | 11 | 7 | 19 |
| 14 | 8 | 5 | 23 | 15 |
| 12 | 1 | 6 | 2 | 3 |
| 16 | 4 | 20 | 21 | 9 |

Accumulation order

FIG. 6

FAST METHOD AND SYSTEM FOR TEMPLATE MATCHING ACQUIRING GLOBAL OPTIMA

BACKGROUND OF THE INVENTION

The invention relates to matching a template to samples.

A template is a reference object having certain quantifiable characteristic properties or attributes that can be related to corresponding quantifiable characteristic properties or attributes of other objects referred to as samples. The difference between these properties or attributes is computed and the sample producing the smallest distance measure relative to the template is considered a "match." Template matching is an important task in the field of computer vision, image processing, and pattern and voice recognition. In image processing, for example, video applications, template matching is applied to block motion estimation, stereo correspondence, pattern matching, and accumulative non-linear optimization.

In general, given a template, $T^d$ (where d is the dimension of the template), and r samples in a search range, $S_i^d$, i=1, . . . , r, the goal is to find the sample in $S_i^d$, i=1, . . . , r, which has the smallest distance measure (i.e. has a minimum error) to the template $T^d$. The dimension d of the template $T^d$ refers to the number of attributes characterizing the template. The attributes will be matched with attributes of the samples $S_i^d$. Dimension d will also be referred to as the dimensionality of the attribute space. The distance between the sample, $S_i^d$, and the template, $T^d$, is frequently defined as the sum of absolute difference $D(T^d, S_i^d)=\Sigma^d_{j=1} |T(j)-S_i(j)|$ or as the sum of square differences $D(T^d, S_i^d)=\Sigma^d_{j=1} |T(j)-S_i(j)|^2$, where j represents the various coordinates in attribute space. Here, the distance measure $D(T^d,S_i^d)$ represents the matching error between the sample, $S_i^d$, and the template, $T^d$. For the application of accumulative non-linear optimization, the distance measure (or error measure) can be defined as $D(S_i)=\Sigma^d_{j=1}F(S_i)$, in which $F(S_i)$ is a positive function. The goal of optimization is to find the $S_i$ that $D(S_i)$ is minimal in the search range.

The complexity of the straightforward algorithm for finding the global minimum using exhaustive search is of the order O(r*d). Because in many applications, the dimensionality of the attribute space and the number of samples can be very large, template matching can be a time-consuming bottleneck. Consider, for example, a video compression application. Each frame in a video sequence is first divided into square image blocks for block motion estimation that usually uses template matching techniques. Each block of the current frame is compared with the blocks in a search range of the previous frame. The attributes used in this application are usually the chromatic values of the pixels in the block. As a simple example, the block size chosen to be 16×16 with each pixel containing R, G, and B information. Thus, the attribute space is 768-dimensional (d=16×16×3= 768). If the search range is chosen to be 64×64, then the number of samples will be 4096 (i.e., r=4096). Notice that this operation is required to be repeated for each block in the frame and for each frame in the video sequence.

In the past few decades, many methods have been proposed to speed up the computations of template matching for different applications. For example, in the field of object recognition, the samples in the search space can be fixed and compared with different templates (inputs). A K-dimensional binary search tree (d=K) can then be used to partition in advance the search space of the samples into hyper-rectangular buckets. The search process for the matching sample includes a global search of the order O(log r) for a target bucket and a local search for the desired sample in the target bucket and the neighboring buckets in the K-dimensional space. The performance degrades exponentially with increasing dimensionality because the query hyper-sphere tends to intersect many more adjacent buckets, causing the number of points to be examined to increase dramatically. Another drawback of this method is that whenever the samples in the search space are changed, a new K-dimensional binary search tree has to be built again, which is quite time-consuming and is usually performed in advance if the search space is static. Due to the above two drawbacks, this method is not suitable for speeding up the template matching where the samples in the search space is dynamic or when the dimensionality of the attribute space is large, such as in the case of motion estimation for video coding.

References which describe the above-mentioned K-dimensional binary search tree include:

1. J. L. Bentley, "Multidimensional Binary Search Trees Used for Associative Searching," Comm. ACM, vol.18, no.9, pp.509–517, Sep., 1975.
2. J. L. Bentley, "Multidimensional Binary Search Trees in Database Applications," IEEE Trans. Software Engineering, vol.5, no.4, pp.333–340, July, 1979.

For those applications for which it is impractical to partition and restrict the search space before a search, other methods need to be used to reduce the number of computations. In video compression applications, for example, gradient descent methods (e.g., three-step search) have been used to narrow the search space for block motion estimation, i.e., to omit the search in certain dimensions of the search space. The search space can also be restricted by using motion prediction from neighboring blocks or from previous frames. Another way of reducing the computational cost is to omit the search in certain dimensions of the attribute space by using a subsampling or early jump-out technique while accumulating the respective distance measures. However, all of the above-mentioned approaches do not guarantee that a global minimum will be found.

A reference which describes a three-step search is: T. Koga, K. Linuma, A. Hirano and T. Ishiguro, "Motion compensated interframe coding for video conferencing," Proceedings of National Telecommunication Conference, pp. G5.3.1–5.3.5, November, 1981.

The work we refer to for using motion prediction is: J. Chalidabbongse and C. C. Jay Kuo, "Fast motion vector estimation using multiresolution-spatio-temporal correlations," IEEE Trans. on Circuits and Systems for Video Technology, vol. 7, pp. 477–488, 1997.

U.S. Pat. No. 5,682,209 describes an early jump-out (or early-exit) technique which omits some dimensions of the attribute space, instead of omitting some dimensions of the search space as is the case in a three-step search.

The invention features a method of omitting certain dimensions of the attribute space to find the global optima using a different strategy than conventional approaches, such as a three-step search and an early jump-out, neither of which can guarantee finding the globally optimal match.

SUMMARY OF THE INVENTION

In general, in one aspect, the invention provides an optimal match between attributes of a template and a sample, the attributes to be matched defining an attribute space, by first computing distance measures between the template and each of the samples in a first subspace of the attribute space that has a lower dimensionality than the attribute space. The smallest distance measure of the computed distance measures is then determined and a new distance measure is computed for the sample that has the smallest distance measure in the first subspace, in a second subspace of a higher dimensionality than the first subspace. The new distance measure is compared with the distance measures previously determined in the first subspace for the other samples. A new minimal distance measure is computed and the process is repeated until the dimensionality of the subspace at which the computed new distance measure is a minimum, is equal to the dimensionality of the attribute space.

Advantageous embodiments of the invention may include one or more of the following features.

The attributes are physical properties of an object, such as size, spatial orientation, luminance and color information of the object. For example, the attributes can include characteristic features of a video image, such as the luminance and chromatic values of the pixels in a predefined block. In another example, the attributes can also include characteristic features of an audio signal, for example audio signal generated and compared in speech recognition applications.

The dimensionality of the template attribute space can be different from that of the sample attribute space, but is preferably identical. The distance measures are preferably first computed in a first subspace having a dimensionality equal to one. The dimensionality of the second subspace is preferably at least one higher than the dimensionality of the first subspace.

A list of ordered candidates of globally best matches (e.g., the three best matches) can be compiled, instead of just one single globally optimal match, by continuing the remaining matching process after the globally optimal match is found and removed from the samples to be matched. With a similar process, multiple global optima can be found by continuing the matching process until a sample with larger matching error (i.e., larger than the global minimum error) is found.

In general, in applications where the computational time is strictly limited, a sub-optimal match between attributes of a template and a sample can be provided by repeating the following process for a predetermined computation duration. In this case, the sample having the largest accumulated dimensionality for the given time duration is chosen to be the optimal match. If more than one sample having the largest dimensionality is found, the sample with the smallest accumulated error measure will be chosen to be the optimal match. The process begins with computing distance measures between the template and each of the samples in a first subspace of the attribute space that has a lower dimensionality than the attribute space. The smallest distance measure of the computed distance measures is then determined and a new distance measure is computed in a second subspace of a higher dimensionality than the first subspace for the sample that has the smallest distance measure in the first subspace. The new distance measure is compared with the distance measures previously determined in the first subspace for the other samples. A new minimal distance measure is computed and the process is repeated until a time limit for performing the computation has been exhausted.

Advantageous embodiments of the invention may include one or more of the following features.

The attributes include characteristic features, such as a video image and the time limit for the computation is associated with a frame rate of a video image. The video image includes pixels, and the attributes include the luminance or chromatic values of the pixels in a predefined block.

In computing the distance measures between the template and each of the samples, the order of the samples for making the computations can be predetermined. For example, the order may be sequential, based on a raster scan (e.g., from top to bottom, right to left), spiral, or any other predefined order. In certain applications, the order can be determined from a histogram, for example, of a video image. In such an application, the histogram may represent a frequency table for each luminance value appearing in the video image.

In general, in another aspect, the invention can be implemented in the form of digital electronic circuitry, or in computer hardware, firmware, software, or combinations of these forms. For example, the invention can be implemented in a computer program product tangibly embodied in a machine-readable storage device for execution by a programmable processor; and method steps of the invention can be performed by a programmable processor executing a program of instructions to perform the above-described functions by operating on input data and generating output. The invention can advantageously be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

Among the advantages of the invention are one or more of the following.

The invention advantageously and dramatically speeds up the computation of template matching while still ensuring finding a globally optimal match. Many conventional schemes for speeding up the computation of template optimal match, such as gradient descent, subsampling, or early jump-out techniques, may result in a trapped local minima, and thus does not guarantee determining the optimal globally match.

The reason that the computational cost of finding global optima can still be greatly reduced is as follows. In the process of calculating the distance measures between the samples and the template, most distance measures are computed only in a low-dimensional space with a dimensionality considerably less than that of the attribute space, and at the higher dimensionalities only for very few samples. In most cases, intermediate accumulations of the distance measures are already greater than the global minimum. Therefore, these accumulations can be terminated, eliminating the need to perform otherwise time-consuming computations associated with the remaining dimensions. Also, only the sample having the minimal distance measure to the template is selected to accumulate the distance measure in the next higher dimension. The higher dimension is recorded and the samples are sorted again according to the updated distance measures. The above process is repeated until the sample having the minimal distance measure has accumulated the error components in all dimensions d. With a suitable data structure, such as a heap, the overhead of each sorting step, except for the step for the first dimension, is less than log r. In block-matching motion estimation, for example, the computational cost can be reduced by about 90% to 99%, depending on the content of the template and the samples.

The invention can also provide a list of globally best matches. In some applications, a list of best matches are very useful for robust computation, human judgement, or other further processing.

Another advantage of this invention is that the global optimality can be sacrificed to satisfy the time constraint required by some applications. For example in video coding, if the time allowed for motion estimation is limited, then the invention can also provide a sub-optimal match by choosing the sample which has the largest accumulated dimensionality when the time limit is met. If there are more than one samples having the largest dimensionality, the one with a smaller distance measure will be chosen as the best match.

Other advantages and features of the invention will be apparent from the following description and from the claims.

BRIEF DESCRIPTION OF THE DRAWINGS

FIGS. 5A–5C are examples of various orderings for accumulating the error measure.

FIG. 6 is another example of an accumulation order determined by a histogram of an image.

DESCRIPTION OF THE PREFERRED EMBODIMENTS

Figure 1:
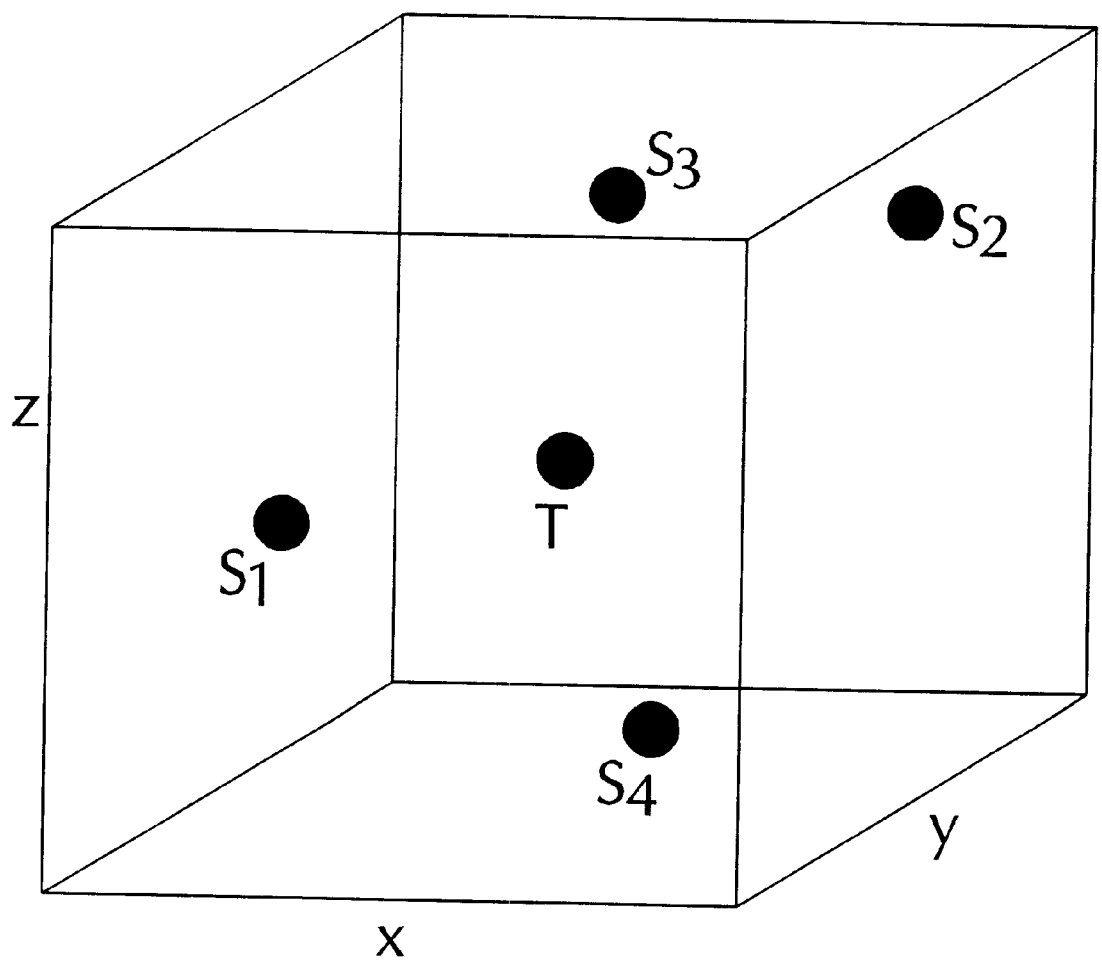
FIG. 1 is an example of a template and samples in a three-dimensional attribute space.

Referring first to the example illustrated in FIG. 1, a template $T^d$ has attributes that can be represented in three-dimensional space (d=3). In this example, the attributes define the coordinates of the template in the three-dimensional space. The attributes of the template $T^d$ are to be compared to with three-dimensional attributes of a number of samples ($S_1$, $S_2$, $S_3$, and $S_4$). Such attributes can be, for example, luminance or chromatic values of the pixels in a video image, but can also include other features, such as color and shading of objects, and/or motion vectors of a sequence of video images. The best match between template $T^d$ and the samples $S_1$, $S_2$, $S_3$, and $S_4$ is obtained if a distance measure computed in the space defined by the attributes (represented, e.g., by a d- dimensional coordinate system) is a minimum. The distance measure example, as the sum of absolute distance measures of the difference of coordinate values or as the sum of squared values of the difference of coordinate values between the template and the respective samples.

Computing a globally minimal distance measure between template $T^d$ and a total of r samples $S_i$ (i=1, . . . , r) in a d-dimensional attribute space requires computing the lengths of r d-dimensional vectors. Performing such computations can be lengthy, in particular if r and d are large numbers. However, the computation for finding the global minimum becomes less complex if the distance between the template and each of the sample points is initially computed in a subspace of a lesser dimensionality than the attribute space. In addition, for many samples, the intermediate distance measure computed in the subspace may already be greater than the global minimum distance. For those samples, further computations in a space of higher dimensionality will be unnecessary and can be omitted.

Figure 2:
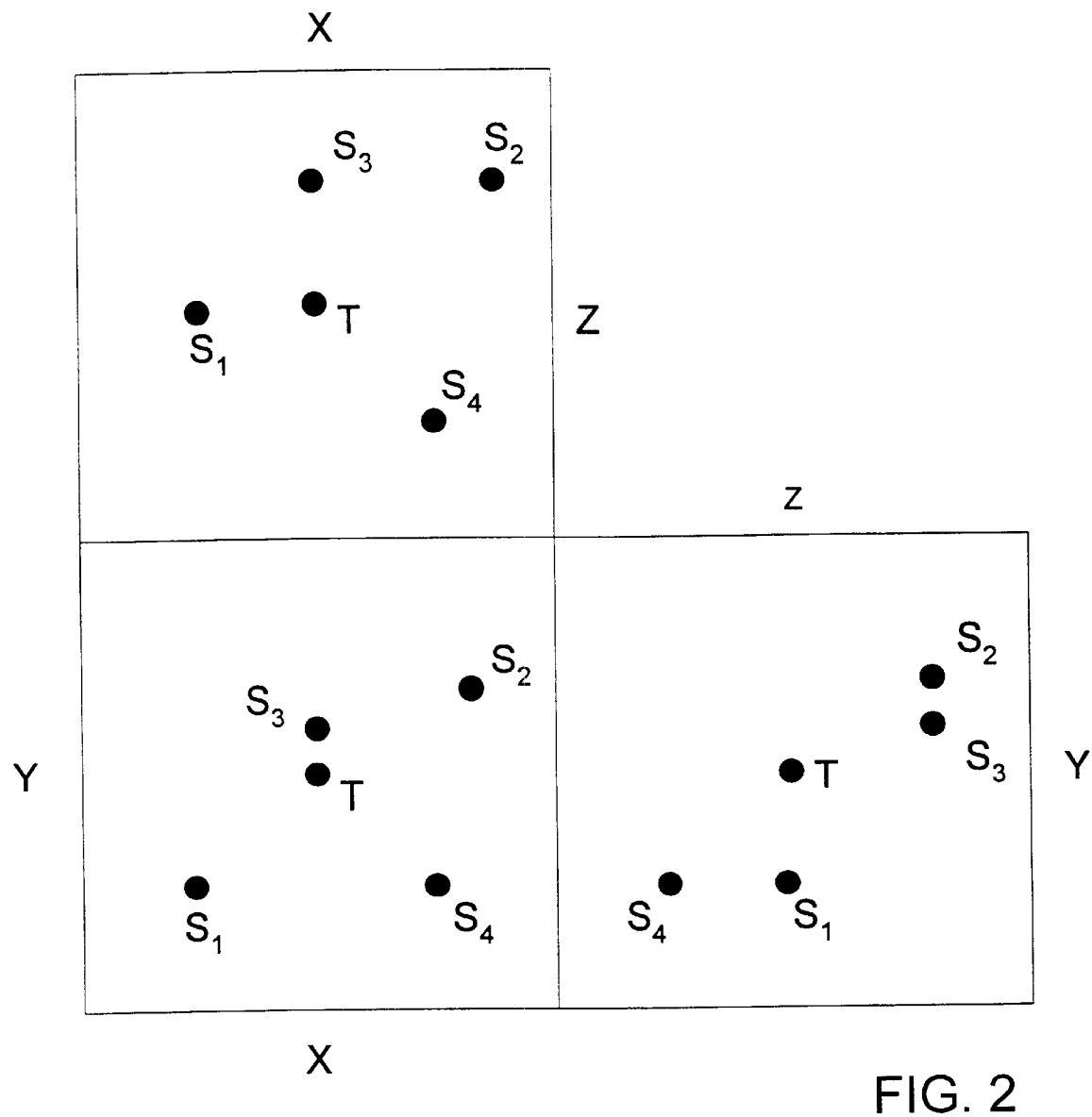
FIG. 2 is a projection of the three-dimensional attribute space on the x-y, y-z and x-z planes.
Figure 4:
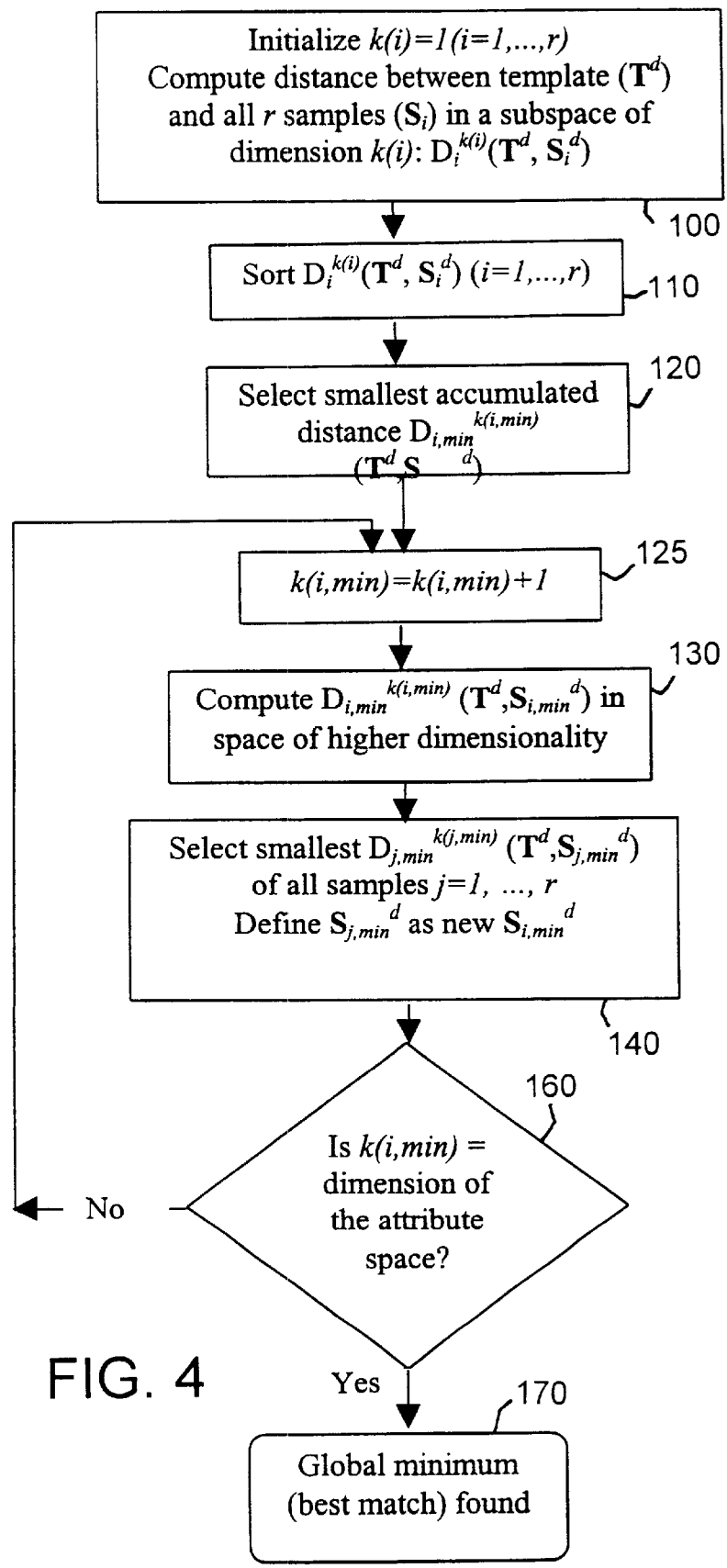
FIG. 4 is a flow diagram showing the process for achieving an optimal global match.

FIG. 2 illustrates the coordinates of FIG. 1 projected on the x-y, the x-z and the y-z planes. The particular coordinates selected for the template $T^d$ and the samples $S_1$, $S_2$, $S_3$, and $S_4$ are listed in Table 1. Assume, for example, the distance measure used in the sum of absolute difference, and let $D_i^k = \Sigma_{j=1}^k |T(j)-Si(j)|$. The process first examines the distance measures $D_i^1$ between template $T^d$ and each of the samples $S_1$, $S_2$, $S_3$, and $S_4$, respectively, in a first dimension, e.g. the x-axis. As seen in FIG. 4, sample $S_3$ has the same x-coordinate as the template $T^d$ and produces the smallest distance measure in the first dimension ($D_3^1$=0).

To simplify the computations, the definition of distance measure, e.g., $D_3^3$, in this example and in the Table 1 is modified to be the sum of absolute difference, rather than, for example, a Euclidean distance.

Next, the distance measure $D_3^2$ between template $T^d$ and sample $S_3$ is calculated in the space with the next higher dimensionality, in the present example, the x-y plane. Alternatively, the x-z plane can be selected. With the coordinates of Table 1, the distance measure $D_3^2$ computed in two dimensions (x-y plane) is equal to 0.1. The two-dimensional distance measure $D_3^2$ between template $T^d$ and $S_3$ is smaller than any of the one-dimensional distance measures $D_3^2$ between the template $T^d$ and the other samples $S_1$, $S_2$, and $S_4$.

Sample $S_3$, however, is not yet a global minimum since it may be offset from template $T^d$ in the third dimension, i.e. the z-axis. Thus, the distance measure $D_3^3$ for $S_3$ in three-dimensional space must be computed next.

As seen from Table 1, the computed three-dimensional distance measure $D_3^3$ (=0.4) of sample $S_3$ is greater than the one-dimensional distance measure $D_1^1$ (=0.25) of the sample $S_1$. Consequently, sample $S_1$ must now be examined in the x-y plane. As seen from Table 1, the two-dimensional distance measure $D_1^2$ (=0.45) for the sample $S_1$ is greater than both the three-dimensional distance measure $D_3^3$ (=0.4) of sample $S_3$ and the one-dimensional distance measure $D_4^1$ (=0.3) of sample $S_4$.

TABLE 1

| | T = (0.5, 0.5, 0.5) | $S_1$ = (0.25, 0.3, 0.5) | $S_2$ = (0.95, 0.7, 0.8) | $S_3$ = (0.5, 0.6, 0.8) | $S_4$ = (0.5, 0.25, 0.25) |
|---|---|---|---|---|---|
| After the 4th step | — | $D_1^1$ = 0.25 | $D_2^1$ = 0.45 | $D_3^1$ = 0.0* | $D_4^1$ = 0.3 |
| After the 5th step | — | $D_1^1$ = 0.25 | $D_2^1$ = 0.45 | $D_3^2$ = 0.1* | $D_4^1$ = 0.3 |
| After the 6th step | — | $D_1^1$ = 0.25* | $D_2^1$ = 0.45 | $D_3^3$ = 0.4 | $D_4^1$ = 0.3 |
| After the 7th step | — | $D_1^2$ = 0.45 | $D_2^1$ = 0.45 | $D_3^3$ = 0.4 | $D_4^1$ = 0.3* |
| After the 8th step | — | $D_1^2$ = 0.45 | $D_2^1$ = 0.45 | $D_3^3$ = 0.4** | $D_4^2$ = 0.55 |
| Dimensionally at which the computation of distance measure stops | | 2 | 1 | 3 Global Minimum | 2 |

*indicates a minimum distance measure
**indicates global minimum at the dimensionality of the attribute space At this point of the process, sample $S_4$ assumes the smallest distance measure with $D_4^1$=0.3, albeit in one dimension. However, when $D_4^2$ is computed in two dimensions, $D_4^2$ increases to 0.55, so that $S_3$ no longer produces a minimal distance measure. Since the distance measure of $S_4$ has been computed in the space with the dimensionality of three-dimensional the attribute space, $S_3$ has been found to produce a global minimum and the best global match with the template $T^d$.

Figure 3:
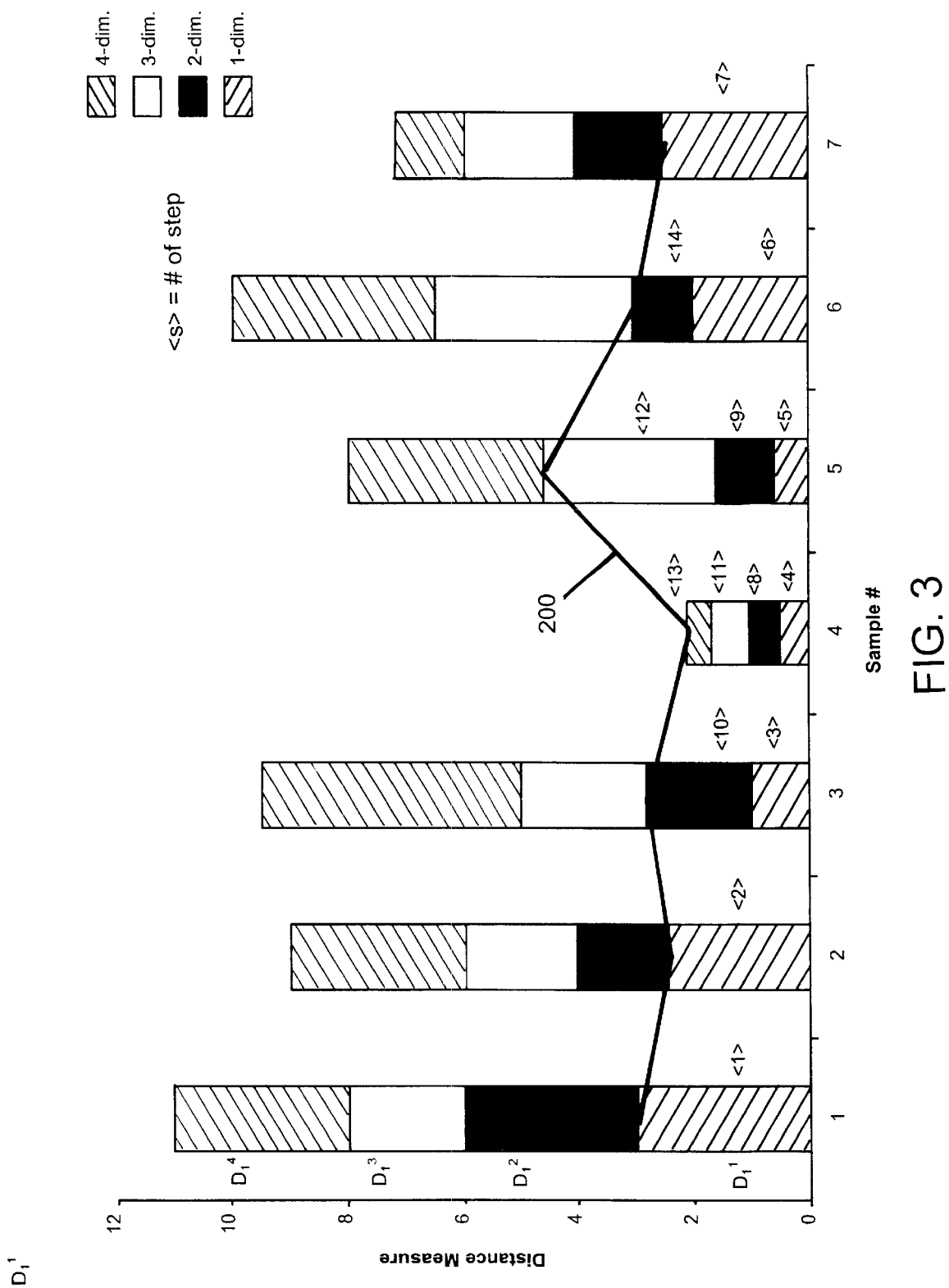
FIG. 3 is another example of the process.

Referring now to FIG. 3, the rapid convergence of the process for globally optimal template matching is illustrated for r=7 samples in the search range and an attribute space of dimension d=4. The seven samples $S_1$ through $S_7$ are arranged on the horizontal axis, with the distance measures $D_i^k$ between the template $T^d$ and the samples $S_i$ in the k dimensional subspaces arranged on the vertical axis. For clarity, the labels $D_i^k$ are only shown for the first sample $S_1$. The numbers <1>, <2> ... <14> refer to the <$S^{th}$> computational step in the process. As in the previous example, none of the points located above the line 200 is required to be computed, since the intermediate accumulations of the distance measures in the first several dimensions for these samples are already greater than the global minimum. This makes the process extremely efficient.

With reference to FIG. 3, the process for achieving the optimal global match of a template $T^d$ to samples $S_i$ is described in conjunction with the flow diagram of FIG. 4. Let k(i) be the largest dimensionality of the current accumulated error for sample i, and $D_i^{k(i)}$ be the current accumulated error for sample i. Initially, let k(i)=1 for all i. Then, compute $D_i^{k(i)}$ in a space with a first dimensionality (step 100 of FIG. 4 and steps <1> through <7> of FIG. 3). The distance measures in the space of the first dimensionality are then sorted according to their magnitudes (step 110). The smallest error measure $D_{i,min}^{k(i,min)}$=min ($D_i^{k(i)}$, i=1, ... r), which in the example is the accumulated error of sample $S_4$, is then selected (step 120).

Subsequently, the dimensionality of the space for sample i is incremented by 1 (step 125) and a new distance measure $D_{i,min}^{k(i,min)}$ for the sample that produced the minimal distance measure ($S_{i,min}$) is computed (step 130). In this example, $S_{i,min}$=$S_4$ after the 7$^{th}$ computational step, and hence $D_4^2$ is the new distance measure computed at the 8$^{th}$ computational step. The new smallest distance measure $D_{j,min}^{k(j,min)}$ is then selected among all the samples and $S_{i,min}^d$ is updated to be $S_{j,min}^d$ (step 140). In this example, the new $S_{i,min}$ is $S_5$. The value of k(i,min) is checked to determine if it is equal to the dimension of the attribute space (step 160). If the value of k(i,min) is equal to the dimension of the attribute space, then the global minimum and therefore the best match between the template $T^d$ and the sample $S_{i,min}^d$ producing $D_{i,min}^{k(i,min)}$ is determined to have been found.

On the other hand, if the dimension k(i,min) is less than the dimension d of the attribute space (step 160), then the process returns to step 125 to compute a new $D_{i,min}^{k(i,min)+1}$ at a higher dimension.

The process in the example of FIG. 3 requires a total of 14 steps to find the minimum $D_4^4$ producing the best global match between the template $T^d$ and sample $S_4$. As seen from FIG. 3, the process avoids the computational steps which are located above the line 200. These are the steps that have intermediate accumulations of the distance measures already greater than the global minimum. The 14 computations are half the possible computational steps for r=7 samples in d=4 dimensions. That is, the process requires 50% less computations. Of the 14 computations, seven are performed in 1 dimension, four in 2 dimensions, two in three dimensions, and one in 4 dimensions. Because most of the computations are performed at lower dimensions, the computational cost is greatly reduced. Although the computational complexity of this algorithm is still O(r*d), the factor can be greatly reduced. In the above example, the factor is 0.5. However, in many practical applications, such as motion estimation in video coding, the template is usually quite different from most of the samples in the search space and hence the factor can be as small as 0.01.

In the example discussed above, the different axes of the d-dimensional attribute space are assumed to have equal weight. In many situations, however, certain attributes have a greater significance for the perceived outcome of a match than others. For example, different color video images can be distinguished more easily based on the luminance signal than on the chrominance signal. Consequently, the luminance signal may be assigned a greater weight. Likewise, in an RGB video format, differences in the red signal or the blue signal are less noticeable than changes in the green signal. In general, therefore, it may be advantageous to first process those attributes that have a greater weight and then "fine tune" the optimization process by processing the signal with the lesser weight at a later time. This approach could be particularly advantageous if only a limited time is available for finding an acceptable match between a template $T^d$ and a sample $S_i$, for example, when computing motion vectors of video frames.

The process described above requires relatively little computation, especially for attribute spaces of high dimensionality. The computational overhead of the process —selection of the smallest distance measure—is not significant if the data are arranged in a suitable form. For r samples, less than log (r) comparisons are required for each selection since only one sample is changed at any given time. In comparison, computing the distance measures of all r samples in a d-dimensional space using an exhaustive search to find the global minimum requires O(r*d) computations.

The process need not start in one dimension. A subspace with a dimension that is less or than or equal to the dimensionality of the attribute space, can also be selected. On the other hand, the process need not continue until k(i,min) is equal to the dimension of the attribute space. For example, if the process has imposed external time constraints, then the process may be terminated when the time limit for performing the computation has been exhausted. In this case, the matching result may not be globally optimal, but can he useful in some applications where time constraint is more important than global optimality, such as in on-line video coding.

In general, all of the samples can share a same order in selecting the subspaces for accumulating the error measure. If preprocessing is available, e.g., in the application of object recognition, each sample is used to compute the best accumulation order of its own. The order can be sequential, random, determined from the template and the samples, or any other pre-defined order. In block motion estimation, for example, the order of the pixels for computing the distances can be based on a raster scan (from top to bottom, from left to right), spiral, or other pre-designated order as shown in FIGS. 5A–5C.

Referring to FIG. 6, the pre-designated order can also be determined from the histogram of a video image, where the histogram represents a frequency table for each luminance value appearing in the image. Here, the histogram can be processed (e.g., smoothed) to achieve better performance. According to the histogram and the luminance values of the pixels in the template, the pixel with luminance value appearing less frequently in the histogram is preferably calculated earlier in order to allow more samples to accumulate larger distance in the earlier stage.

Figure 7:
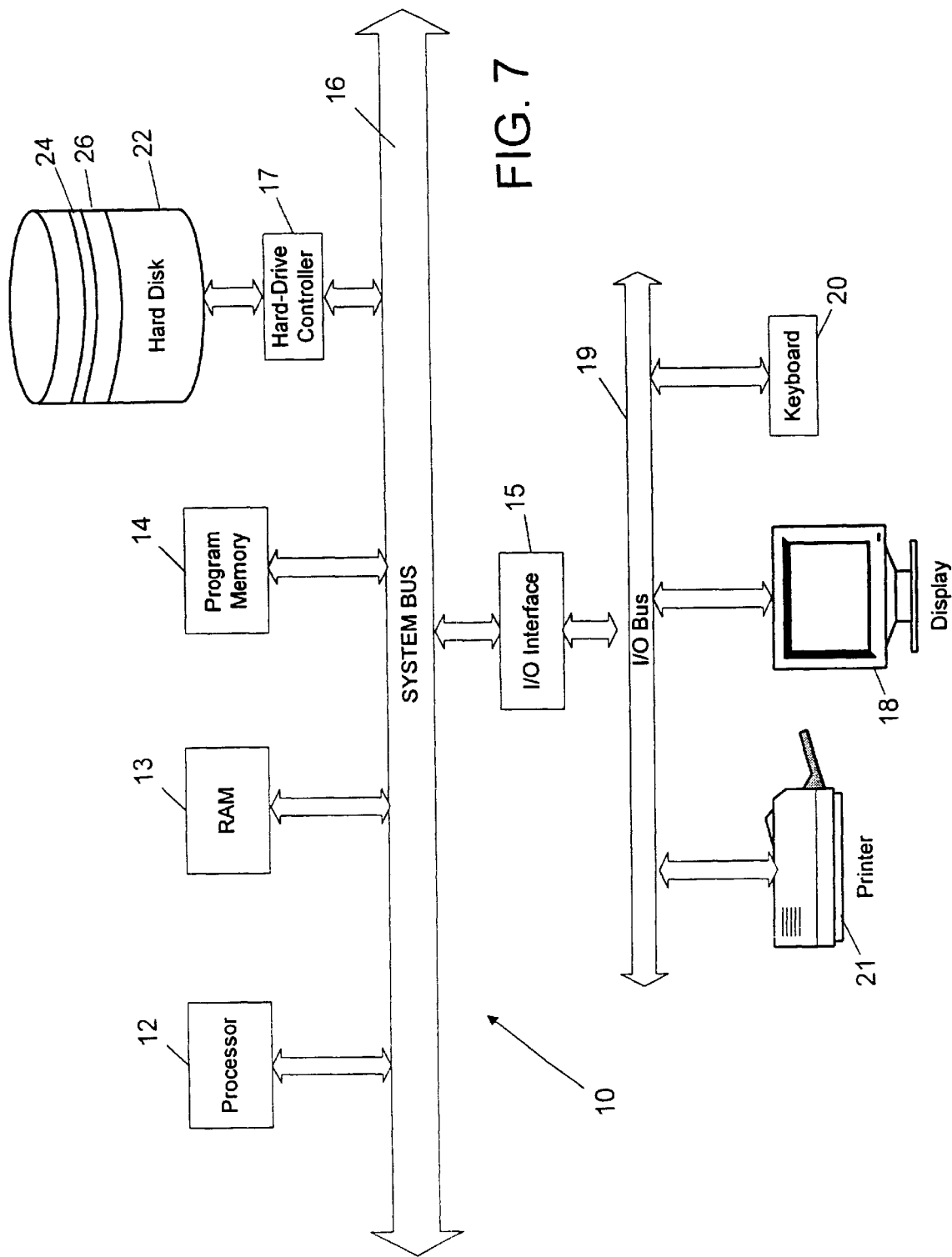
FIG. 7 is a block diagram of a computer system.

An example of a computer for carrying out the method is shown in FIG. 7, which shows a block diagram of a programmable processing system 10 suitable for implementing or performing the apparatus or methods of the invention. The system 10 includes a processor 12, a random access memory (RAM) 13, a program memory 14 (for example, a writable read-only memory (ROM) such as a flash ROM), a hard drive controller 17, and an input/output (I/O) controller 15 coupled by a processor (CPU) bus 16. The system 10 can be preprogrammed, in ROM, for example, or it can be programmed (and reprogrammed) by loading a program from another source (for example, from a floppy disk, a CD-ROM, or another computer).

The hard drive controller 17 is coupled to a hard disk 22 suitable for storing executable computer programs 24, including programs embodying the present invention, and data files, including the documents to be compared.

Also coupled to the I/O bus 19 is a display 18, a keyboard 20, and a printer 21. Alternatively, separate connections and/or separate buses can be used for the I/O interface 15, display 18 and keyboard 20.

The above description of the invention is illustrative and not limiting. Other embodiments of the invention are within the following claims.

What is claimed is:

1. A method for providing an optimal match between attributes of a template and a sample, the attributes to be matched defining an attribute space, the method comprising:
   a) computing distance measures between the template and each of the samples in a first subspace of the attribute space that has a lower dimensionality than the attribute space;
   b) after computing distance measures, determining the smallest distance measure of the computed distance measures;
   c) computing in a second subspace of a higher dimensionality than the first subspace a new distance measure for the sample that has the smallest distance measure in the first subspace, and comparing the new distance measure with the distance measures previously determined in the first subspace for the other samples; and
   d) repeating steps b) and c) until the dimensionality of the subspace at which the computed new distance measure is a minimum, is equal to the dimensionality of the attribute space.

2. A method for providing an optimal match between attributes of a template and a sample, the attributes to be matched defining an attribute space, the method comprising:
   a) computing distance measures between the template and each of the samples in a first subspace of the attribute space that has a lower dimensionality than the attribute space;
   b) after computing distance measures, determining the smallest distance measure of the computed distance measures;
   c) computing in a second subspace of a higher dimensionality than the first subspace a new distance measure for the sample that has the smallest distance measure in the first subspace, and comparing the new distance measure with the distance measures previously determined in the first subspace for the other samples; and
   d) repeating steps b) and c) until a time limit for performing the computation has been exhausted.

3. The method of claim 1, wherein the attributes are physical properties of an object.

4. The method of claim 3, wherein the properties are selected from the group consisting of size, spatial orientation, luminance and color information.

5. The method of claim 1, wherein the attributes comprise features of an image.

6. The method of claim 5, wherein the image is a video image.

7. The method of claim 6, the video image further comprising pixels, wherein the attributes include luminance or chromatic values and motion vectors of the pixels.

8. The method of claim 7, wherein the motion vectors are computed for predetermined blocks of the video images.

9. The method of claim 1, wherein the attributes comprise characteristic features of an audio signal.

10. The method of claim 1, wherein repeatedly computing includes providing a list of ordered candidates of globally best matches.

11. The method of claim 1, wherein the dimensionality of the attribute space is the lesser of a number of attributes of the sample and of the template.

12. The method of claim 1, wherein the dimensionality of the first subspace is equal to one.

13. The method of claim 1, wherein the dimensionality of the second subspace is increased by one over the dimensionality of the first subspace.

14. The method of claim 1, wherein repeating the steps b) and c) includes computing a list of ordered candidates of globally best matches.

15. The method of claim 2, wherein the attributes comprise features of a video image.

16. The method of claim 15, the video image further comprising pixels, wherein the attributes include the luminance or chromatic values and motion vectors of the pixels.

17. The method of claim 16, wherein the motion vectors are computed for predetermined blocks of the video images.

18. The method of claim 15, wherein the time limit for the computation is associated with a frame rate of the video image.

19. The method of claim 2, wherein repeating the steps b) and c) includes computing a list of ordered candidates of globally best matches.

20. The method of claim 1, wherein the computing distance measures between the template and each of the samples, includes predetermining the order of the samples for making the computations.

21. The method of claim 20, wherein the order of the samples is sequential.

22. The method of claim 20, wherein the order of the samples is based on a raster scan.

23. The method of claim 20, wherein the order of the samples is based on a histogram.

24. A computer program, residing on a computer-readable medium, for providing an optimal match between attribute data of a template and attribute data of a sample, the attribute data to be matched defining an attribute space, the computer program comprising instructions for causing a computer to:

a) first compute from the attribute data distance measures between the template and each of the samples in a first subspace of the attribute space that has a lower dimensionality than the attribute space;

b) determine the smallest distance measure of the computed distance measures;

c) compute in a second subspace of a higher dimensionality than the first subspace a new distance measure for the sample that has the smallest distance measure in the first subspace, and compare the new distance measure with the distance measures previously determined in the first subspace for the other samples; and d) repeat steps b) and c) until the dimensionality of the subspace at which the computed new distance measure is a minimum, is equal to the dimensionality of the attribute space.

* * * * *